(12) United States Patent
Curnock et al.

(10) Patent No.: US 10,364,020 B2
(45) Date of Patent: Jul. 30, 2019

(54) PITCH CHANGE MECHANISM FOR A BLADED ROTOR

(71) Applicant: ROLLS-ROYCE plc, London (GB)

(72) Inventors: Philip A Curnock, Bristol (GB); Mario Di Martino, Derby (GB)

(73) Assignee: ROLLS-ROYCE plc, London (GB)

( * ) Notice: Subject to any disclaimer, the term of this patent is extended or adjusted under 35 U.S.C. 154(b) by 367 days.

(21) Appl. No.: 15/253,556

(22) Filed: Aug. 31, 2016

(65) Prior Publication Data
US 2017/0066522 A1    Mar. 9, 2017

(30) Foreign Application Priority Data

Sep. 9, 2015 (GB) .................................. 1515929.6

(51) Int. Cl.
| | | |
|---|---|---|
| *B64C 11/32* | (2006.01) | |
| *F04D 29/36* | (2006.01) | |
| *B64C 11/06* | (2006.01) | |
| *F01D 7/00* | (2006.01) | |

(52) U.S. Cl.
CPC .............. *B64C 11/32* (2013.01); *B64C 11/06* (2013.01); *F04D 29/362* (2013.01); *Y02T 50/66* (2013.01)

(58) Field of Classification Search
CPC ....... B64C 11/32; B64C 11/06; F04D 29/362; F01D 7/00
USPC .............................. 416/140, 104, 27, 26, 159
See application file for complete search history.

(56) References Cited

U.S. PATENT DOCUMENTS

| | | | | |
|---|---|---|---|---|
| 2,711,796 A | * | 6/1955 | Amiot ...................... | B63H 3/02 416/152 |
| 3,528,752 A | | 9/1970 | Drabek | |
| 3,901,626 A | * | 8/1975 | McMurtry ................ | F01D 7/00 416/157 A |
| 3,922,852 A | | 12/1975 | Drabek | |
| 3,994,128 A | | 11/1976 | Griswold, Jr. et al. | |
| 4,061,440 A | | 12/1977 | Belliere | |
| 5,156,648 A | * | 10/1992 | Hora ....................... | B64C 11/32 416/129 |

OTHER PUBLICATIONS

Helix Angle—Wikipedia the free encyclopedia, May 25, 2015, Wikipedia (Year: 2015).*

(Continued)

*Primary Examiner* — David E Sosnowski
*Assistant Examiner* — Maranatha Boardman
(74) *Attorney, Agent, or Firm* — Oliff PLC (57) ABSTRACT

A pitch change mechanism for a bladed rotor includes a driving sleeve, a drive shaft, a first pitch-changing element, a second pitch-changing element, and a plurality of blade drive gears. The driving sleeve has, in axial sequence, a first helical connection portion and a second helical connection portion. The driving sleeve is positioned concentrically with and surrounding the drive shaft. The first pitch-changing element has a first end drivingly engaged with the first helical connection portion, and a first ring gear portion at a second opposite end, while the second pitch-changing element has a first end drivingly engaged with the second helical connection portion, and a second ring gear portion at a second opposite end. The plurality of blade drive gears are arranged in a circumferential array around a longitudinal axis of the drive shaft.

18 Claims, 2 Drawing Sheets

(56) References Cited

OTHER PUBLICATIONS

Jan. 3, 2017 Search Report issued in European Patent Application No. 16186480.
Feb. 25, 2016 Search Report issued in British Patent Application No. 1515929.6.

* cited by examiner

PITCH CHANGE MECHANISM FOR A BLADED ROTOR

This disclosure claims the benefit of UK Patent Application No. GB1515929.6, filed on 9 Sep. 2015, which is hereby incorporated herein in its entirety.

FIELD OF THE DISCLOSURE

The present disclosure relates to a pitch change mechanism for a bladed rotor and particularly, but not exclusively, to a pitch change mechanism for an aircraft propeller.

BACKGROUND TO THE DISCLOSURE

The use of a mechanism to vary the pitch of propeller blades on a propeller assembly is well known. This change of pitch provides the propeller blades with an optimum degree of blade angle for any particular flight condition.

A pitch change mechanism also allows for the blade pitch to be reversed to provide a braking effect, for example, when an aircraft is landing.

A typical such pitch change mechanism for use in a turbofan engine is disclosed in U.S. Pat. No. 3,922,852. In this mechanism, a linear actuator is interconnected with a helical cam means which in turn provides rotary motion of a single ring gear. The ring gear meshes with a bevel gear at the root of each fan blade to provide synchronised angular rotation to each of the fan blades.

The single ring gear acting on the fan blade shaft causes a large resultant axial force on the pitch change mechanism. This results in an axial load on the fan blade bearings, which in turn adds size and weight to the entire mechanism.

STATEMENTS OF DISCLOSURE

According to a first aspect of the present disclosure there is provided a pitch change mechanism for a bladed rotor comprising:

a driving sleeve having, in axial sequence, a first helical connection portion and a second helical connection portion;

a drive shaft, the driving sleeve being positioned concentric with and surrounding the drive shaft a first pitch-changing element having a first end drivingly engaged with the first helical connection portion, and a first ring gear portion at a second opposite end;

a second pitch-changing element having a first end drivingly engaged with the second helical connection portion, and a second ring gear portion at a second opposite end; and a plurality of blade drive gears arranged in a circumferential array around the longitudinal axis of the drive shaft, the first pitch-changing element being positioned axially adjacent to the second pitch-changing element with the first ring gear portion facing the second ring gear portion, wherein the first and second pitch-changing elements are positioned concentrically over the driving sleeve, such that axial movement of the driving sleeve causes the first helical connection portion to rotate the first pitch-changing element in a first rotational direction, and simultaneously causes the second helical connection portion to rotate the second pitch-changing element in an opposite second rotational direction, with the contra-rotation of the first and second pitch-changing elements causing a rotation of the plurality of blade drive gears positioned between and meshingly coupled to each of the first ring gear portion and the second ring gear portion.

The use of opposing first and second ring gear portions provides equal and opposite axial loading on opposing sides of the blade drive gears. This in turn results in no net axial loading on the blade drive gears, and hence no net axial forces on the blade shafts. This enables each of the blades and its associated drive gear to be made lighter and more compact.

The use of first and second helical connection portions that rotate in opposing directions to one another enables a single actuator means to be used to provide pitch rotation of the blades. This makes the pitch change mechanism of the present disclosure simpler and lighter than prior art systems having separate actuation systems.

Optionally, the first helical connection portion comprises a first helical driving portion meshingly engaged with a first helical driven portion, and the second helical connection portion comprises a second helical driving portion meshingly engaged with a second helical driven portion, the first helical driving portion being arranged on a radially outwardly facing surface of the driving sleeve, the first helical driven portion being arranged on a radially inwardly facing surface of the first pitch changing element, the second helical driving portion being arranged on a radially outwardly facing surface of the driving sleeve, the second helical driven portion being arranged on a radially inwardly facing surface of the second pitch changing element, and the driving sleeve being arranged concentrically around a drive shaft, the driving sleeve being meshingly engaged with the drive shaft by a first linear splined connection.

In this arrangement, the driving sleeve comprises a unitary arrangement of the first helical connection portion and the second helical connection portion. The first helical connection portion is formed at one end of the driving sleeve, and the second helical connection portion is formed at an opposite end of the driving sleeve.

This unitary arrangement makes the pitch change mechanism simple, lightweight and easy to assemble for a user.

Optionally, the driving sleeve comprises a first driving sleeve portion and a second driving sleeve portion, the first and second driving sleeve portions being arranged concentrically around a drive shaft, the first driving sleeve portion being meshingly engaged with the first pitch changing element by a first linear splined connection, the second driving sleeve portion being meshingly engaged with the second pitch changing element by a second linear splined connection, the first helical connection portion comprises a first helical driving portion meshingly engaged with a first helical driven portion, and the second helical connection portion comprises a second helical driving portion meshingly engaged with a second helical driven portion, the first helical driving portion being arranged on a radially outwardly facing surface of the drive shaft, the first helical driven portion being arranged on a radially inwardly facing surface of the first driving sleeve portion, the second helical driving portion being arranged on a radially outwardly facing surface of the drive shaft, and the second helical driven portion being arranged on a radially inwardly facing surface of the second driving sleeve portion.

In this arrangement, the first and second helical connection portions are positioned radially within the driving sleeve. This minimises the radial size of the first and second helical connection portions which, in turn, enables it to be lighter than the alternative arrangement in which the first and second helical connection portions are positioned radially outside the driving sleeve.

Optionally, each of the first helical connection portion and the second helical connection portion comprise a ballscrew arrangement.

The use of a ballscrew arrangement for first and second helical connection portions enables the frictional forces arising from the operation of the connection portions to be minimised. This makes the pitch change mechanism more efficient.

Optionally, the ballscrew arrangement has a helix angle of between approximately 25° and 50° relative to a longitudinal axis of the driving sleeve.

In order to enable the rotation of the blades to cover the range of operation extending from 'feather' to 'fine', it is necessary for the blade drive gear to have approximately 140° of rotation.

In one example of the disclosure, this range of rotation is achievable with a helix angle of 30°. This enables the frictional forces within the ballscrew arrangement to be minimised and hence the efficiency of the pitch change mechanism to be optimised.

Optionally, each of the first helical connection portion and the second helical connection portion comprise a helical spline arrangement.

The use of helical gearing to interconnect each pair of first helical driving portion and first helical driven portion, and second helical driving portion and second helical driven portion, provides a compact and weight-efficient means of transforming a linear movement of the actuator into rotational movement of the first and second pitch-changing elements.

Optionally, the helical spline arrangement has a helix angle of between approximately 50° and 80° relative to a longitudinal axis of the driving sleeve.

In one arrangement, the helical spline arrangement has a helix angle of approximately 50°. This configuration provides a balance between minimising the frictional forces generated by the helical gearing and maintaining a level of stiction between respective ones of the first and second driving and driven portions.

Optionally, the pitch change mechanism further comprises an actuator, the actuator having a stationary part rigidly fixed to a support structure, and a movable part adapted to provide axial movement of the first and second pitch-changing elements.

This enables the operation of the pitch change mechanism to be independent from the operation of the engine so allowing pitch change to be carried out when the engine is not operating.

Optionally, the actuator is coaxial with the driving sleeve.

This enables the actuator to be positioned coaxially with the driving sleeve, which allows the pitch change mechanism of the disclosure to be more compact and simpler than conventional pitch change mechanisms.

Alternatively, the pitch change mechanism may comprise two actuator systems, a first for coarse control adjustments that is used for deploying the brakes during thrust reversal (braking system), and a second for fine adjustments (pitch control tuning system) that is used in all other flight conditions. This would enable the pitch change mechanism to have a pitch lock only on the braking system, so avoiding an inadvertent deployment of the braking system during normal flight conditions.

Optionally, the axial movement is a linear axial movement.

In the present disclosure, the axial movement generated by the actuator is a linear movement. This provides for a direct linear correspondence between the movement of the first and second pitch-changing elements and the rotation of the blades.

In another arrangement, the axial movement generated by the actuator is a non-linear axial movement. In this arrangement, the movement of the first and second pitch-changing elements causes increasing or decreasing rotation of the blades.

Optionally, each of the first and second pitch-changing elements further comprises an annular web connecting respective ones of the first and second helical driven portions to corresponding ones of the first and second ring gear portions.

The annular web connecting respective ones of the first and second helical driven portions to corresponding ones of the first and second ring gear portions provides a lightweight and simple load transfer across the pitch-changing element.

Optionally, the first ring gear portion comprises a first axial support bearing adapted to prevent axial deflection of the first ring gear portion, and the second ring gear portion comprises a second axial support bearing adapted to prevent axial deflection of the second ring gear portion.

The use of axial support bearings to react axial loading resulting from the gear tooth interaction between respective pairs of ring gear portions and corresponding ones of the blade drive gear enables the pitch changing elements to be made lighter.

Optionally, each of the first and second ring gear portions is a tapered ring gear.

The use of a tapered ring gear for each of the first and second ring gear portions allows the meshing interaction between the ring gear portions and the blade drive gears to be more easily optimised by preloading the blade drive gears in a radially inward direction. This makes a propeller assembly employing the pitch change mechanism of the disclosure simpler and lighter than prior art arrangements.

According to a second aspect of the present disclosure there is provided a propeller assembly comprising:
  a drive shaft driven by an engine;
   a plurality of propeller blades; and
   a pitch change mechanism according to the first aspect of the disclosure,
  wherein the pitch change mechanism is interposed between the drive shaft and the plurality of propeller blades, each of the plurality of propeller blades being directly coupled to a respective one of the propeller blade drive gears.

According to a third aspect of the present disclosure there is provided a turbofan engine comprising a pitch change mechanism according to the first aspect of the disclosure.

According to a fourth aspect of the present disclosure there is provided an open-rotor engine comprising a pitch change mechanism according to the first aspect of the disclosure.

According to a fifth aspect of the present disclosure there is provided an aircraft comprising a propeller assembly according to the second aspect of the disclosure.

According to a sixth aspect of the present disclosure there is provided the use of an aircraft comprising a propeller assembly according to the second aspect of the disclosure.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure.

DETAILED DESCRIPTION

Figure 1:
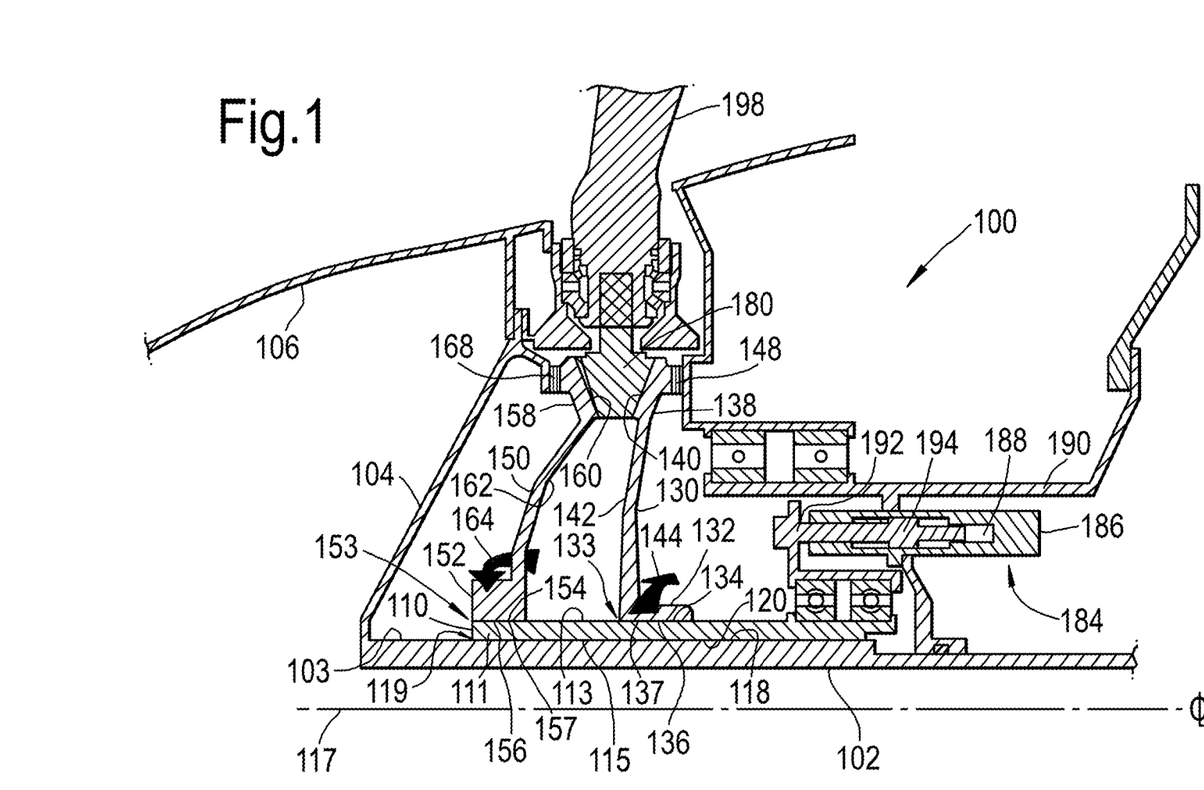
FIG. 1 shows a schematic sectional view of a pitch change mechanism for a bladed rotor according to a first embodiment of the disclosure.

Referring to FIG. 1, a pitch change mechanism for an aircraft propeller according to a first embodiment of the disclosure is designated generally by the reference numeral 100.

The pitch change mechanism 100 has a driving sleeve 110, a first pitch-changing element 130, and a second pitch-changing element 150.

The driving sleeve 110 has, in axial sequence, a first helical connection portion 133 and second helical connection portion 153. The driving sleeve 110 is positioned concentric with and surrounding a drive shaft 102 that in turn is driven by a gas turbine engine (not shown).

The driving sleeve 110 is arranged concentrically around the drive shaft 102. The driving sleeve 110 is meshingly engaged with the drive shaft 102 by a first linear splined connection 119. The first linear splined connection 119 comprises a first linear driving portion 118 arranged on a radially outwardly facing surface 103 of the drive shaft 102, and a first linear driven portion 120 arranged on a radially inwardly facing surface 115 of the driving sleeve 110.

The drive shaft 102 is typically machined from a titanium alloy or other similar aerospace metal alloy. In another arrangement, the drive shaft 102 may be formed from additive layer manufacturing or sintering techniques.

The driving sleeve 110 is further provided, at a forward end 111, with a forward extension piece 104. The forward extension piece 104 rotates with the driving sleeve 110 and supports a propeller nose cone 106.

The first pitch-changing element 130 has a first end 132 and an opposite second end 138. The first end 132 of the first pitch-changing element 130 is drivingly engaged with the first helical connection portion 133 and the second end 138 of the first pitch-changing element 130 has a first ring gear portion 140.

The second pitch-changing element 150 also has a first end 152 and an opposite second end 158. The first end 152 of the second pitch-changing element 150 is drivingly engaged with the second helical connection portion 154 and the second end 158 of the second pitch-changing element 150 has a second ring gear portion 160.

The first helical connection portion 133 comprises a first helical driving portion 134 meshingly engaged with a first helical driven portion 136. The first helical driving portion 134 is arranged on a radially outwardly facing surface 113 of the driving sleeve 110. The first helical driven portion 136 is arranged on a radially inwardly facing surface 115 of the first pitch changing element 130.

The second helical connection portion 153 comprises a second helical driving portion 154 meshingly engaged with a second helical driven portion 156. The second helical driving portion 154 is arranged on a radially outwardly facing surface 113 of the driving sleeve 110, the second helical driven portion 156 being arranged on a radially inwardly facing surface 157 of the second pitch changing element 150.

In this arrangement, each of the first helical driving portion 134 and the second helical driving portion 154 is formed on the driving sleeve 110. The second helical driving portion 154 is arranged at the forward end 111 of the driving sleeve 110. The first helical driving portion 134 is arranged distal to the forward end 111 of the driving sleeve 110.

In this arrangement, each of the first helical connection portion 133 and the second helical connection portion 153 comprises a ballscrew arrangement having a helix angle of 30° relative to a longitudinal axis 117 of the driving sleeve 110. The ballscrew arrangement is configured such that an axial movement of the driving sleeve 110 results in a rotational movement of each of the first pitch changing element 130 and the second pitch changing element 150.

The helix angle of the ballscrew arrangement of the first helical connection portion 133 is equal and opposite to the helix angle of the ballscrew arrangement of the second helical connection portion 153. This means that an axial movement of the driving sleeve 110 results in contra-rotation of the first pitch changing element 130 and the second pitch changing element 150.

Each of the first and second pitch-changing elements 130,150 further comprises an annular web 142,162 connecting respective ones of the first and second helical driven portions 136,156 to corresponding one of the first and second ring gear portions 140,160.

Each of the first and second pitch-changing elements 130,150 is typically manufactured as a titanium forging that is subsequently machined to finished dimensions. In another arrangement, the first and second pitch-changing elements 130,150 may be formed by additive layer manufacturing or sintering techniques.

The first pitch-changing element 130 is positioned axially adjacent to the second pitch-changing element 150, with the first ring gear portion 140 being positioned facing the second ring gear portion 160.

The first ring gear portion 140 and the second ring gear portion 160 are both formed as tapered bevel ring gears. The facing arrangement of the first and second ring gear portions 140,160 is such that a blade drive gear 180 can be readily positioned therebetween so as to meshingly engage with both of the first and second ring gear portions 140,160. In this arrangement, the blade drive gear 180 is a tapered bevel drive gear, and the first and second ring gear portions 140,160 are tapered bevel ring gears.

A first support bearing 148 is provided at the second end 138 of the first pitch changing element 130 to react the loads generated by the interaction between the first ring gear portion 140 and the blade drive gear 180. A corresponding second support bearing 168 is provided at the second end 158 of the second pitch changing element 150 to react the loads generated by the interaction between the second ring gear portion 160 and the blade drive gear 180.

In the present arrangement a plurality of blade drive gears 180 are arranged in a circumferential array around the longitudinal axis 117 of the drive shaft 102. In the present arrangement, there are eighteen blade drive gears 180. In other arrangements, there may be an alternative quantity of blade drive gears 180 in the array.

An actuator 184 is provided axially rearwards of the first and second pitch-changing elements 130,150. The actuator 184 has a stationary part 186 and a movable part 192. The stationary part 186 is rigidly fixed to a rearward extension piece 190. The rearward extension piece 190 is stationary and connects to the airframe structure (not shown). The movable part 192 is adapted to provide axial movement of the first and second pitch-changing elements 130,150.

In the present disclosure, the actuator 184 is formed as an annular piston 194 located within a corresponding annular cavity 188. In another arrangement, the actuator 184 may comprise a plurality of individual actuator elements (not shown) arranged circumferentially around the driving sleeve 110.

In use, the actuator 184 provides an axial displacement to the driving sleeve 110. The driving sleeve 110 is coupled to the drive shaft 102 by the first linear splined connection 119. This linear splined connection 119 constrains the driving sleeve 110 to move only axially relative to the drive shaft 102.

Each of the first pitch changing element 130 and the second pitch changing element 150 is axially constrained by corresponding ones of the first support bearing 148 and second support bearing 168.

The axial movement of the driving sleeve 110 results in corresponding axial movements of each of the first helical driving portion 134 and the second helical driving portion 154.

As outlined above, the helical ballscrew connection between the first helical driving portion 134 and the first helical driven portion 136 means that axial movement of the first helical driving portion 134 causes the first helical driven portion 136 to move rotationally in a first rotational direction 144.

Similarly, the helical ballscrew connection between the second helical driving portion 154 and the second helical driven portion 156 means that axial movement of the second helical driving portion 154 causes the second helical driven portion 156 to move rotationally in a second rotational direction 164. The second rotational direction 164 is opposite to the first rotational direction 144.

The contra-rotation of the first and second pitch-changing elements 130,150 causes a rotation of a plurality of the propeller blade drive gears 180 positioned between and meshingly coupled to each of the first ring gear portion 140 and the second ring gear portion 160.

A propeller blade 198 is coupled to each of the propeller blade drive gears 180 such that actuation of the pitch change mechanism 100 results in simultaneous and co-ordinated rotation of each of the propeller blades 198.

Figure 2:
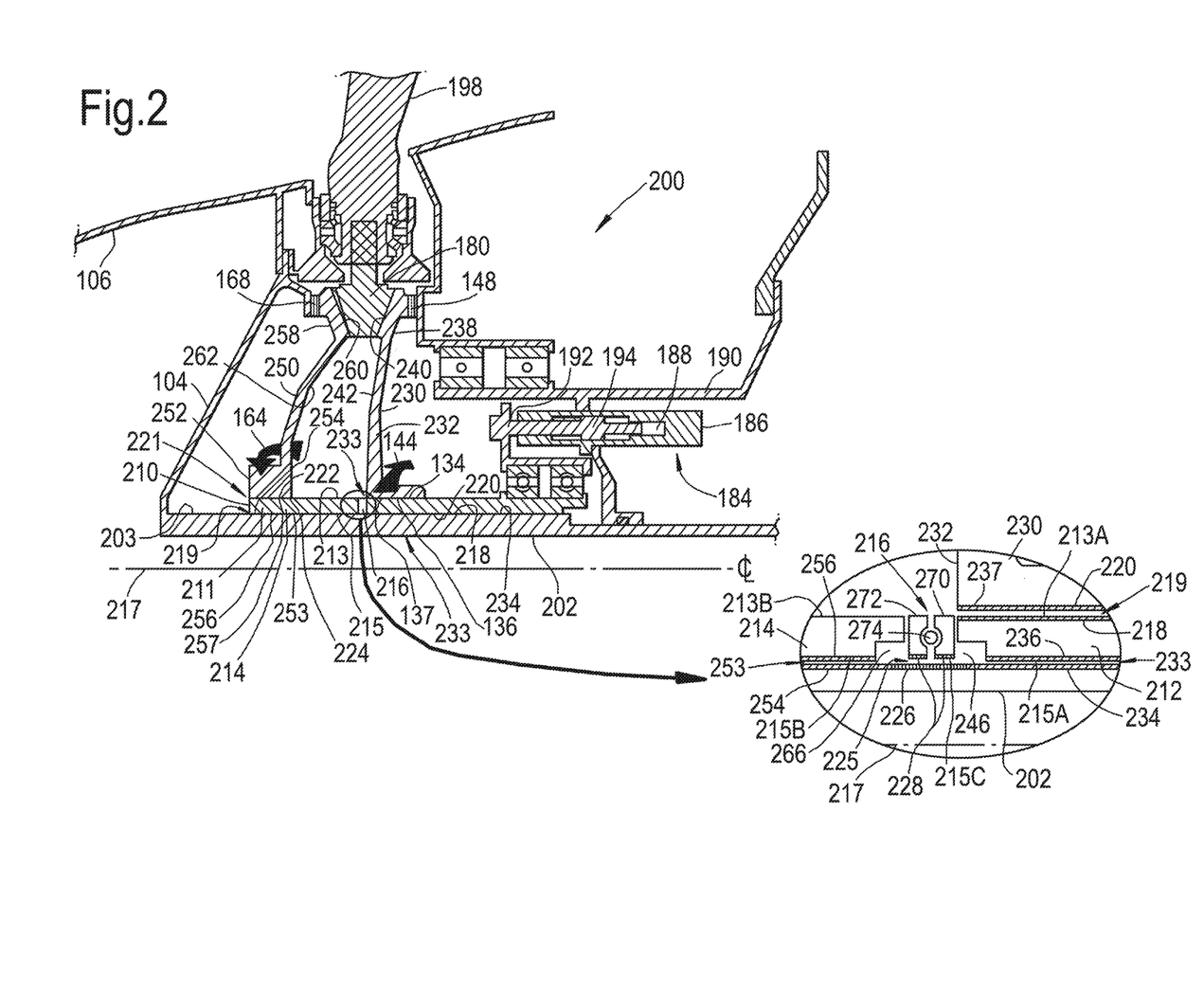
FIG. 2 shows a schematic sectional view of a pitch change mechanism for a bladed rotor according to a second embodiment of the disclosure.

Referring to FIG. 2, a pitch change mechanism according to a second embodiment of the disclosure is designated generally by the reference numeral 200. Features of the pitch change mechanism 200 which correspond to those of the pitch change mechanism 100 have been given corresponding reference numerals for ease of reference.

The pitch change mechanism 200 has a driving sleeve 210, a first pitch-changing element 230, and a second pitch-changing element 250.

The driving sleeve 210 is positioned concentric with and surrounding a drive shaft 202 that in turn is driven by a gas turbine engine (not shown).

The driving sleeve 210 comprises a first driving sleeve portion 212, a second driving sleeve portion 214, a third driving sleeve portion 216, a radially outwardly facing surface 213, and a radially inwardly facing surface 215. The radially outwardly facing surface 213 includes a radially outwardly facing surface 213A and a radially outwardly facing surface 213B, and the radially inwardly facing surface 215 includes a radially inwardly facing surface 215A, a radially inwardly facing surface 215B and a radially inwardly facing surface 215C. The second driving sleeve portion 214 is positioned at the forward end 211 of the driving sleeve 210. The first driving sleeve portion 212 is positioned distal to the forward end 211 of the driving sleeve 210. The third driving sleeve portion 216 is positioned between the second driving sleeve portion 214 and the first driving sleeve portion 212. In other words, the driving sleeve 210 comprises in axial sequence, from the forward end 211 of the driving sleeve, the second driving sleeve portion 214, the third driving sleeve portion 216 and the first driving sleeve portion 212.

The first driving sleeve portion 212 is meshingly engaged with the first pitch changing element 230 by a first linear splined connection 219. The first linear splined connection 219 comprises a first linear driving portion 218 arranged on the radially outwardly facing surface 213A of the first driving sleeve portion 212, and a first linear driven portion 220 arranged on a radially inwardly facing surface 237 of the first pitch changing element 230.

The second driving sleeve portion 214 is meshingly engaged with the second pitch changing element 250 by a second linear splined connection 221. The second linear splined connection 221 comprises a second linear driving portion 222 arranged on the radially outwardly facing surface 213B of the second driving sleeve portion 214, and a second linear driven portion 224 arranged on a radially inwardly facing surface 257 of the second pitch changing element 250.

A first helical connection portion 233 is positioned at the first driving sleeve portion 212 and a second helical connection portion 253 is positioned at the second driving sleeve portion 214.

The first driving sleeve portion 212 is meshingly engaged with the drive shaft 210 by a first helical connection portion 233. The first helical connection portion 233 comprises a first helical driving portion 234 arranged on a radially outwardly facing surface 203 of the drive shaft 202, and a first helical driven portion 236 arranged on the radially inwardly facing surface 215A of the first driving sleeve portion 212.

The first driving sleeve portion 212 comprises a first clearance 246 being an annular recess positioned on the radially inwardly facing surface 215A of the first driving sleeve portion 212 at an end of the first driving sleeve portion 212 adjacent the third driving sleeve portion 216.

The second driving sleeve portion 214 is meshingly engaged with the drive shaft 210 by a second helical connection portion 253. The second helical connection portion 253 comprises a second helical driving portion 254 arranged on a radially outwardly facing surface 203 of the drive shaft 202, and a second helical driven portion 256 arranged on the radially inwardly facing surface 215B of the second driving sleeve portion 214.

The second driving sleeve portion 214 comprises a second clearance 266 being an annular recess positioned on the radially inwardly facing surface 215B of the second driving sleeve portion 214 at an end of the second driving sleeve portion 214 adjacent the third driving sleeve portion 216.

The third driving sleeve portion 216 is meshingly engaged with the drive shaft 210 by a third linear splined connection 225. The third linear splined connection 225 comprises a third linear driving portion 226 arranged on a radially outwardly facing surface 203 of the drive shaft 202, and a third linear driven portion 228 arranged on the radially inwardly facing surface 215C of the third driving sleeve portion 216.

The third driving sleeve portion 216 comprises, in axial series, a first thrust bearing race 270, a plurality of thrust bearing elements 274, and a second thrust bearing race 272.

The plurality of thrust bearing elements 274 are distributed circumferentially around the third driving sleeve portion 216.

In an alternative arrangement, the first thrust bearing race 270 may comprise a floating configuration.

The first thrust bearing race 270 abuts against an end of the first driving sleeve portion 212, and the second thrust bearing race 272 abuts against an end of the second driving sleeve portion 214. Consequently, the third driving sleeve portion 216 provides for the first driving sleeve portion 212 to rotate in a first rotational direction 144, and the second driving sleeve portion 214 to rotate in an opposite second rotational direction 164, whilst providing for axial load transmission from the first driving sleeve portion 212 to the second driving sleeve portion 214 and vice versa.

The first driving sleeve portion 212, the second driving sleeve portion 214, and the third driving sleeve portion 216 are typically machined from a titanium alloy or other similar aerospace metal alloy. In another arrangement, these components may be formed from additive layer manufacturing or sintering techniques.

The drive shaft 202 is further provided, at a forward end 211, with a forward extension piece 104. The forward extension piece 104 rotates with the driving shaft 202 and supports a propeller nose cone 106.

The first pitch-changing element 230 has a first end 232 and an opposite second end 238. The first end 232 of the first pitch-changing element 230 is drivingly engaged with the first driving sleeve portion 212 and the second end 238 of the first pitch-changing element 230 has a first ring gear portion 240.

The second pitch-changing element 250 also has a first end 252 and an opposite second end 258. The first end 252 of the second pitch-changing element 250 is drivingly engaged with the second driving sleeve portion 214 and the second end 258 of the second pitch-changing element 250 has a second ring gear portion 260.

In this arrangement, each of the first helical connection portion 233 and the second helical connection portion 253 comprises a ballscrew arrangement having a helix angle of 30° relative to a longitudinal axis 217 of the driving sleeve 210. The ballscrew arrangement is configured such that an axial movement of the driving sleeve 210 results in a rotational movement of each of the first pitch changing element 230 and the second pitch changing element 250.

The helix angle of the ballscrew arrangement of the first helical connection portion 233 is equal and opposite to the helix angle of the ballscrew arrangement of the second helical connection portion 253. This means that an axial movement of the driving sleeve 210 results in contrarotation of the first pitch changing element 230 and the second pitch changing element 250.

Each of the first and second pitch-changing elements 230,250 further comprises an annular web 242,262 connecting respective ones of the first and second linear driving portions 218,222 to corresponding one of the first and second ring gear portions 240,260.

Each of the first and second pitch-changing elements 230,250 is typically manufactured as a titanium forging that is subsequently machined to finished dimensions. In another arrangement, the first and second pitch-changing elements 230,250 may be formed by additive layer manufacturing or sintering techniques.

The first pitch-changing element 230 is positioned axially adjacent to the second pitch-changing element 250, with the first ring gear portion 240 being positioned facing the second ring gear portion 260.

The first ring gear portion 240 and the second ring gear portion 260 are both formed as tapered bevel ring gears. The facing arrangement of the first and second ring gear portions 240,260 is such that a blade drive gear 180 can be readily positioned therebetween so as to meshingly engage with both of the first and second ring gear portions 240,260. In this arrangement, the blade drive gear 180 is a tapered bevel drive gear, and the first and second ring gear portions 240,260 are tapered bevel ring gears.

A first support bearing 148 is provided at the second end 238 of the first pitch changing element 230 to react the loads generated by the interaction between the first ring gear portion 140 and the blade drive gear 180. A corresponding second support bearing 168 is provided at the second end 258 of the second pitch changing element 250 to react the loads generated by the interaction between the second ring gear portion 260 and the blade drive gear 180.

In the present arrangement a plurality of blade drive gears 180 are arranged in a circumferential array around the longitudinal axis 217 of the drive shaft 202. In the present arrangement, there are eighteen blade drive gears 180. In other arrangements, there may be an alternative quantity of blade drive gears 180 in the array.

Each of the first pitch changing element 230 and the second pitch changing element 250 is axially constrained by corresponding ones of the first support bearing 148 and second support bearing 168.

The axial movement of the driving sleeve 210 results in rotational movements of each of the first driving sleeve portion 212 and the second driving sleeve portion 214.

As outlined above, the helical ballscrew connection between the first helical driving portion 234 and the first helical driven portion 236 means that axial movement of the first driving sleeve portion 212 causes the first helical driven portion 236 to move rotationally in a first rotational direction 144.

Similarly, the helical ballscrew connection between the second helical driving portion 254 and the second helical driven portion 256 means that axial movement of the second driving sleeve portion 214 causes the second helical driven portion 256 to move rotationally in a second rotational direction 164. The second rotational direction 164 is opposite to the first rotational direction 144.

The first and second support bearings 148,168 constrain the first and second pitch changing elements 230,250 respectively in the axial direction. The axial movement of the first and second driving sleeve portions 212,214 is accommodated by the axial movement allowed by the corresponding first and second linear splined connections 219,221.

The contra-rotation of the first and second pitch-changing elements 230,250 causes a rotation of a plurality of the propeller blade drive gears 180 positioned between and meshingly coupled to each of the first ring gear portion 140 and the second ring gear portion 160.

In the present disclosure, the pitch change mechanism 100:200 is described in the context of its application to a multi-bladed propeller assembly. It is to be understood that the pitch change mechanism 100:200 of the disclosure may be equally applicable to an open-rotor engine or to a turbofan engine in which it varies the pitch of the fan blades. Alternatively, the pitch change mechanism 100:200 of the disclosure may be applied to varying the pitch of the blades of a marine propeller, or some other rotating bladed assembly.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A pitch change mechanism for a bladed rotor comprising:
    a driving sleeve having, in axial sequence, a first helical connection portion and a second helical connection portion;
    a drive shaft, the driving sleeve being positioned concentric with and surrounding the drive shaft;
    a first pitch-changing element having a first end drivingly engaged with the first helical connection portion, and a first ring gear portion at a second opposite end;
    a second pitch-changing element having a first end drivingly engaged with the second helical connection portion, and a second ring gear portion at a second opposite end; and
    a plurality of blade drive gears arranged in a circumferential array around a longitudinal axis of the drive shaft,
    the first pitch-changing element being positioned axially adjacent to the second pitch-changing element, and being positioned on a same side of the driving sleeve, with the first ring gear portion facing the second ring gear portion,
    wherein the first end of the first pitch-changing element that is drivingly engaged with the first helical connection portion is on a same radial side of the driving sleeve as the first end of the second pitch-changing element that is drivingly engaged with the second helical connection portion, and
    wherein the first and second pitch-changing elements are positioned concentrically over the driving sleeve, such that axial movement of the driving sleeve causes the first helical connection portion to rotate the first pitch-changing element in a first rotational direction, and simultaneously causes the second helical connection portion to rotate the second pitch-changing element in an opposite second rotational direction, with the contra-rotation of the first and second pitch-changing elements causing a rotation of the plurality of blade drive gears positioned between and meshingly coupled to each of the first ring gear portion and the second ring gear portion.

2. The pitch change mechanism as claimed in claim 1, wherein the first helical connection portion comprises a first helical driving portion meshingly engaged with a first helical driven portion, and the second helical connection portion comprises a second helical driving portion meshingly engaged with a second helical driven portion,
    the first helical driving portion being arranged on a radially outwardly facing surface of the driving sleeve, the first helical driven portion being arranged on a radially inwardly facing surface of the first pitch changing element,
    the second helical driving portion being arranged on a radially outwardly facing surface of the driving sleeve, the second helical driven portion being arranged on a radially inwardly facing surface of the second pitch changing element, and
    the driving sleeve being arranged concentrically around a drive shaft, the driving sleeve being meshingly engaged with the drive shaft by a first linear splined connection.

3. The pitch change mechanism as claimed in claim 1, wherein
    the driving sleeve comprises a first driving sleeve portion and a second driving sleeve portion, the first and second driving sleeve portions being arranged concentrically around the drive shaft, the first driving sleeve portion being meshingly engaged with the first pitch changing element by a first linear splined connection, the second driving sleeve portion being meshingly engaged with the second pitch changing element by a second linear splined connection, and
    the first helical connection portion comprises a first helical driving portion meshingly engaged with a first helical driven portion, and the second helical connection portion comprises a second helical driving portion meshingly engaged with a second helical driven portion,
    the first helical driving portion being arranged on a radially outwardly facing surface of the drive shaft, the first helical driven portion being arranged on a radially inwardly facing surface of the first driving sleeve portion, and
    the second helical driving portion being arranged on a radially outwardly facing surface of the drive shaft, and the second helical driven portion being arranged on a radially inwardly facing surface of the second driving sleeve portion.

4. The pitch change mechanism as claimed in claim 1, wherein each of the first helical connection portion and the second helical connection portion comprises a ballscrew arrangement.

5. The pitch change mechanism as claimed in claim 4, wherein the ballscrew arrangement has a helix angle of between approximately 25° and 50° relative to a longitudinal axis of the driving sleeve.

6. The pitch change mechanism as claimed in claim 1, wherein each of the first helical connection portion and the second helical connection portion comprises a helical spline arrangement.

7. The pitch change mechanism as claimed in claim 6, wherein the helical spline arrangement has a helix angle of between approximately 50° and 80° relative to a longitudinal axis of the driving sleeve.

8. The pitch change mechanism as claimed in claim 1, further comprising an actuator, the actuator having a stationary part rigidly fixed to a support structure, and a movable part adapted to provide axial movement of the first and second pitch-changing elements.

9. The pitch change mechanism as claimed in claim 8, wherein the actuator is parallel to the driving sleeve.

10. The pitch change mechanism as claimed in claim 8, wherein the axial movement is a linear axial movement.

11. The pitch change mechanism as claimed in claim 9, wherein the axial movement is a linear axial movement.

12. The pitch change mechanism as claimed in claim 1, wherein each of the first and second pitch-changing elements further comprises an annular web connecting respective ones of the first and second helical driven portions to corresponding ones of the first and second ring gear portions.

13. The pitch change mechanism as claimed in claim 1, wherein the first ring gear portion comprises a first axial support bearing adapted to prevent axial deflection of the first ring gear portion, and the second ring gear portion comprises a second axial support bearing adapted to prevent axial deflection of the second ring gear portion.

14. The pitch change mechanism as claimed in claim 1, wherein each of the first and second ring gear portions is a tapered ring gear.

15. A propeller assembly comprising:
a plurality of propeller blades; and
the pitch change mechanism as claimed in claim 1, wherein
the drive shaft is driven by an engine, and
the pitch change mechanism is interposed between the drive shaft and the plurality of propeller blades, each of the plurality of propeller blades being directly coupled to a respective one of the propeller blade drive gears.

16. A turbofan engine comprising a pitch change mechanism as claimed in claim 1.

17. An open-rotor engine comprising a pitch change mechanism as claimed in claim 1.

18. An aircraft comprising a propeller assembly as claimed in claim 15.

* * * * *